Sept. 26, 1961 K. R. REICK 3,001,463

PHOTOCOPY APPARATUS

Filed Jan. 23, 1958 3 Sheets-Sheet 1

Inventor
Kenneth R. Reick

By Hill, Sherman, Meroni, Gross & Simpson Attys

Sept. 26, 1961 K. R. REICK 3,001,463

PHOTOCOPY APPARATUS

Filed Jan. 23, 1958 3 Sheets-Sheet 2

Inventor
Kenneth R. Reick

By Hill, Sherman, Meroni, Gross & Simpson Attys

Sept. 26, 1961 K. R. REICK 3,001,463

PHOTOCOPY APPARATUS

Filed Jan. 23, 1958 3 Sheets-Sheet 3

Inventor
Kenneth R. Reick

By Hill, Sherman, Meroni, Gross & Simpson Attys 3,001,463

PHOTOCOPY APPARATUS

Kenneth R. Reick, 634 S. Main St., Lombard, Ill.

Filed Jan. 23, 1958, Ser. No. 710,706
5 Claims. (Cl. 95—77.5)

The present invention relates to improvements in apparatus for producing photocopies of letters, various documents, and other printed or hand written papers, and the like.

Direct contact photocopies are produced by exposing light of suitable intensity through a sheet having thereon the original material to be reproduced, while the face of the sheet bearing such original material is in direct contact with a light sensitive surface or emulsion on a negative copy sheet. Thereafter, the negative copy sheet and a positive copy sheet are passed through a developer bath and a suitably sensitized face of the positive copy sheet is brought into direct pressure engagement with the exposed light sensitive face of the negative sheet, so that by action of the developer solution upon the respective sensitized emulsion surfaces of the juxtaposed faces, a positive transfer of the image from the negative sheet to the positive sheet takes place. Surplus developer solution is squeezed from the sheets while in the laminar, transfer relation of the sheets, and upon separation a positive image is apparent upon the sensitized or emulsion face of the positive copy sheet.

Prior apparatus for effecting light exposure of the original material and the negative sheet, and for effecting development and transfer from the negative to the positive copy sheet has often been rather cumbersome and inefficient and expensive not only in structure, but also to operate.

It is, accordingly, an important object of the present invention to provide apparatus of this kind comprising a compact arrangement of parts in order to be produced in a small size unit, ruggedly constructed, light in weight, low in manufacturing costs and highly efficient in the production of photocopies.

Another object of the invention is to provide photocopy apparatus embodying substantially simplified control means.

A further object of the invention is to provide an improved photocopy apparatus in which a substantial proportion of the components are adapted to be made from lightweight synthetic plastic materials.

Still another object of the invention is to provide in a photocopy machine improved drive means for moving components.

Yet another object of the invention is to provide improved light exposure mechanism in a photocopy machine.

A still further object of the invention is to provide in a photocopy machine a novel compact, coordinated relationship of exposure light and development apparatus for efficient production of photocopies.

Other objects, features and advantages of the present invention will be readily apparent from the following detailed description of a preferred embodiment thereof taken in conjunction with the accompanying drawings, in which.

Figure 1:
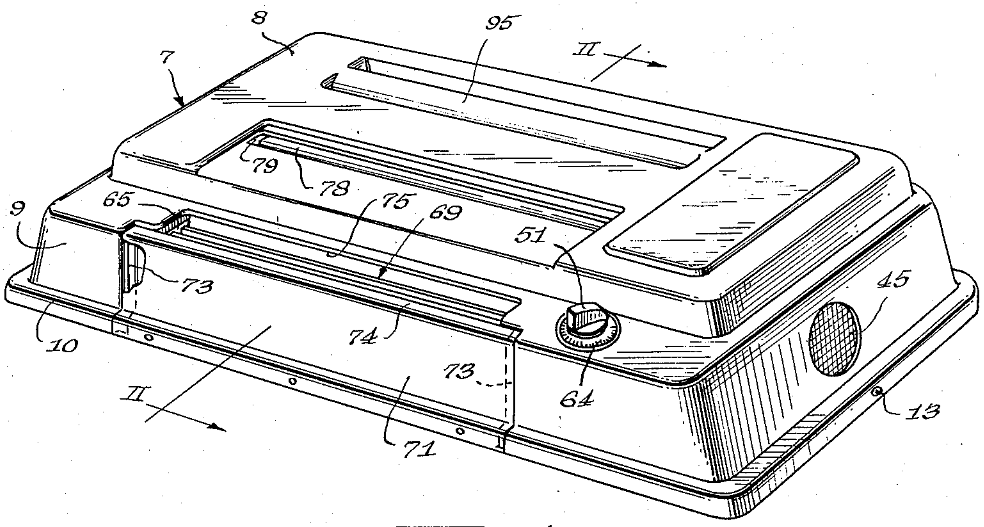
FIGURE 1 is a perspective view of a photocopy machine embodying features of the invention.
Figure 2:
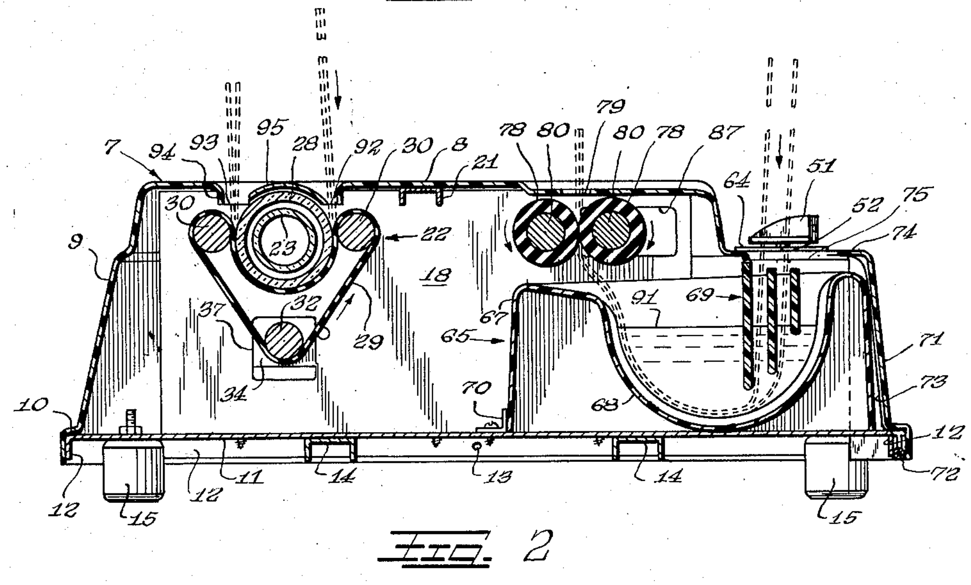
FIGURE 2 is an enlarged sectional elevational detail view taken substantially on the line II—II of FIGURE 1.

Referring to FIGURES 1 and 2, the photocopy machine of present invention is constructed as a relatively small, compact, attractive table model including an enclosure housing casing 7 which is preferably a one-piece shaped or stamped sheet metal unit or as has been provided commercially a molded thin synthetic plastic shell provided with a top wall 8 marginally merging with depending side walls 9 disposed in generally rectangular outline and flaring slightly downwardly and outwardly to lower marginal combination reinforcing and seating means in the form of an offset angular seating flange structure 10 providing a downwardly and inwardly opening generally rabbet groove seat engageable upon the margins provided by a complementary base plate 11 providing a platform for supporting all of the mechanism and appurtenances of the machine. It will be observed that various generally upright and horizontal angular ribs and corners in the housing casing shell 7, in addition to the angular reinforcing and seating flange 10 afford substantial reinforcement and rigidity in the thin top and side wall panel portions or sections.

Along its margins, the supporting plate 11 is provided with downturned reinforcing flanges 12 to which the depending portion of the housing shell seating flange 10 is detachably secured at the opposite sides of the machine assembly by means of respective screws 13. Since the base plate 11 comprises a panel of substantial area, it is preferably reinforced as by means of reinforcing bars 14 preferably secured as by means of welding to the underside of the base plate. Through this arrangement, the base plate 11 is adapted to be made from relatively thin sheet metal stock. Also attached to the underside of the base plate 11, adjacent to the respective opposite corners thereof are supporting means herein in the form of preferably resilient legs 15.

Figure 3:
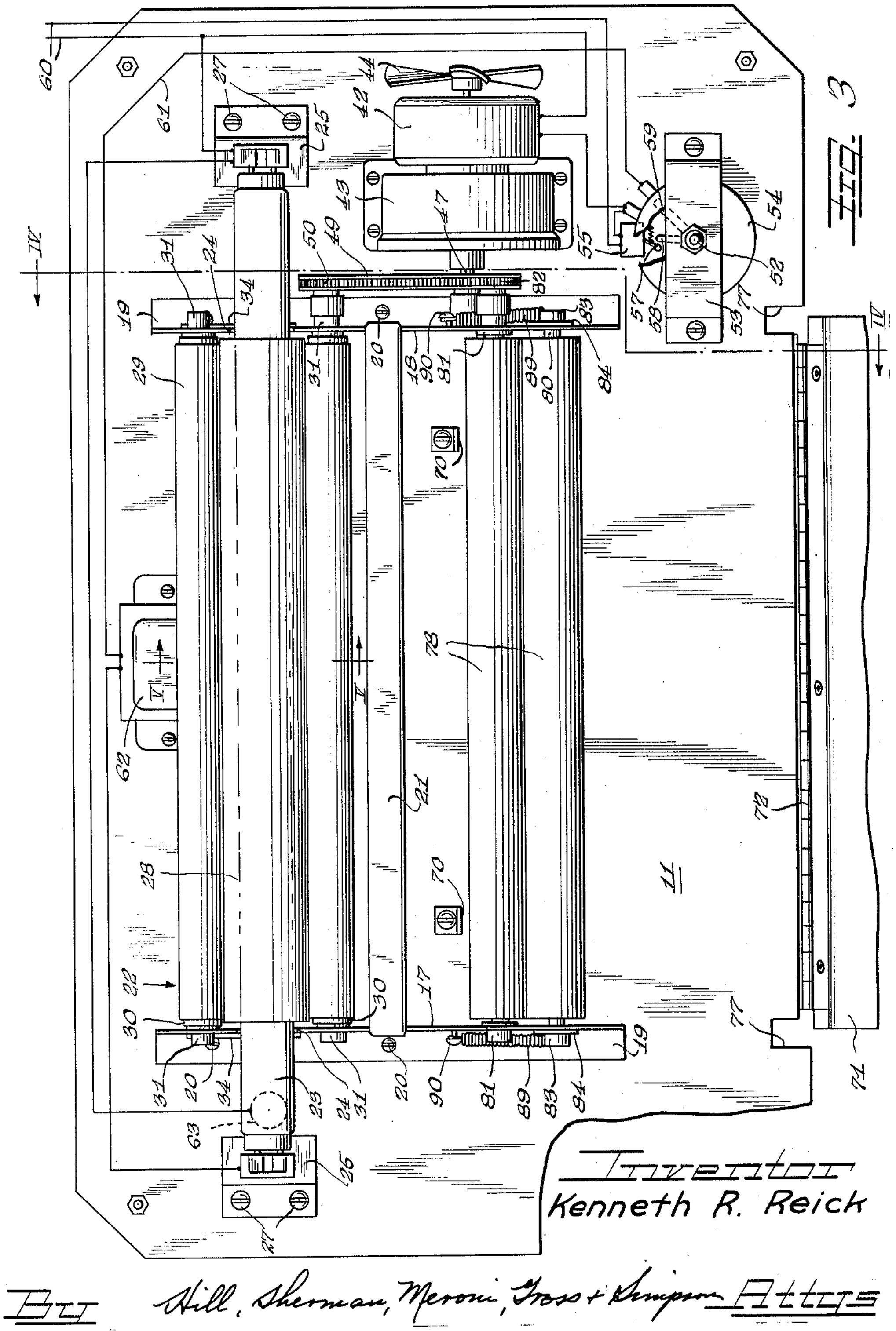
FIGURE 3 is an enlarged top plan view of the machine, with the housing casing removed.

Supported upon the base plate 11 and within the chamber provided by the housing 7 are means for effecting exposure of material to be copied in association with negative copy paper to a photographic light source, and also means for thereafter developing and transferring the negative to a positive copy paper. To this end, the base plate 11 is provided with suitable supporting frame structure, in the present instance provided simply by a pair of spaced parallel upstanding sheet metal supporting frame bracket plate flange members 17 and 18 located adjacent respectively the left and right sides of the base plate 11. Attachment of the supporting flanges 17 and 18 to the top of the base plate 11 to extend in front to rear direction thereon is conveniently effected by means of lower marginal right angular respective foot flanges 19 on the supporting flange plates secured as by means of screws 20 to the base plate. A stabilizer bar 21 is preferably connected across the upper margins of the supporting bracket flanges 17 and 18 (FIGS. 2 and 3).

For effecting photographic exposure of an original of which a copy is to be made and a negative paper exposure apparatus 22 is supported by and between the rear portions of the bracket flanges 17 and 18. To this end, a source of illumination in the form of a fluorescent light tube 23 is mounted to extend through respective upwardly opening clearance cut-outs or notches 24 in the upper rear margins of the bracket flanges 17 and 18, suitable supporting and terminal brackets 25 being mounted upon and secured as by means of screws 27 to the base plate 11 adjacent to the respective outer sides of the bracket flanges for removably engaging with the usual pair of axially projecting terminals on the respective opposite ends of the light tube.

Concentrically disposed in spaced relation about the fluorescent light tube 23 is a rotatably mounted transparent tubular cylinder 28 of a length at least equal to the width of originals and photocopy papers to be exposed to the light from the light tube 23. At its respective opposite ends the cylinder 28 freely opposes the inner sides of the respective supporting bracket flanges 17 and 18. Although the cylinder 28 may be made from glass as indicated by the sectioning in FIGURE 2 for convenience in illustration, it is preferably made from a less breakable material such as a transparent synthetic plastic material.

Rotary support for the cylinder 28 is provided by means coactive with the cylinder to engage and press the laminar originals and negative photo papers, tightly together and against the cylinder 28 for exposure to light from the tube 23 transmitted through the cylinder. To this end, an endless flexible belt 29 of suitable elastic material such as natural or synthetic rubber is provided in a tubular length to provide a belt width about equal or slightly less than the length of the cylinder 28. A pair of horizontally aligned parallel, generally coextensive rollers 30 supports the endless belt 29 in a manner to run thereover for supporting the cylinder 28 rotatably. Preferably the rollers 30 are made of a hard material such as metal with suitable journal ends thereon mounted in bearings 31 carried by the respective bracket flanges 17 and 18 (FIG. 3).

As will be observed in FIGURE 2, the belt supporting rollers 30 are of substantially smaller diameter than the cylinder 28 and are mounted with their axes in a plane at a slightly higher elevation than the axis of the light tube 23. In addition, the respective peripheries of the rollers 30 are spaced apart slightly greater than the outside diameter of the exposure cylinder 28, but less than the combined outside diameter of the cylinder 28 and the double thickness of the belt 29, that is the thickness of the belt interposed between each of the rollers 30 and the cylinder 28. As a result, the endless belt 29 looped over the rollers 30 and between the rollers looped under the cylinder 28 and drawn taut by a tensioning roller 32, located advantageously below the cylinder 28, engages firmly in wrapped relation about slightly more than 180° of the periphery of the cylinder 28, cradles the cylinder substantially concentrically relative to the light tube 23, and positively rotates the cylinder 28 upon endless travel of the belt 29 over the rollers 30.

Figure 4:
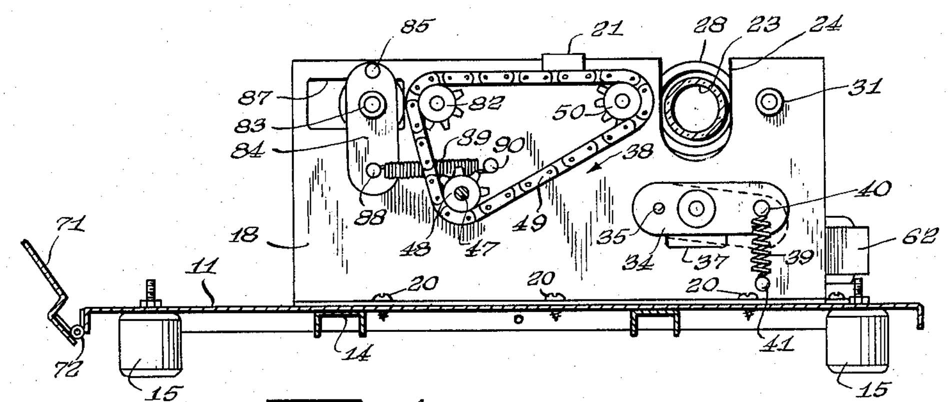
FIGURE 4 is a sectional elevational view taken substantially on the line IV—IV of FIGURE 3.

Tensionable mounting of the tensioning roller 32 is effected by spring and lever means herein comprising respective flat plate lever members 34 (FIGS. 2, 3 and 4) mounted pivotally by means of suitable respective pivot rivets 35 on the outer faces of the respective supporting flange brackets 17 and 18 to extend in front to rear direction across suitable respective clearance openings 37 in the bracket flanges and carrying in each instance a bearing 38 in which a respective journal end of the tensioning roller 32 is rotatably engaged. Adjacent to its free end, each of the tensioning levers 34 has a tension spring 39 attached at one end thereof to a stud 40 carried by the lever, the opposite end of the spring being anchored to the associated bracket plate at a suitable position below the free end of the tensioning lever as by engagement of the lower end of the spring onto a fixed stud 41. By having the roller bearing axis located nearer the pivot 35, as best seen in FIG. 4, than to the spring anchorage 40, high leverage advantage is attained with moderate spring weight. In the relaxed, non-tensioning condition of the tensioning roller 32, contraction of the tensioning springs 39 and the weight of the roller drops the tensioning levers 34 down to the dash line position shown in FIGURE 4. In the full tensioning condition of the roller 32, caused by drawing up of the belt 29 as looped under the tensioning roller, upward swinging of the levers 34 is caused about the pivot fulcrums 35 thereof with accompanying tensioning of the springs 39.

Actuation of the exposure assembly 22 is effected by driving of one of the rollers 30, herein the forwardmost one of the rollers by suitable driving means including herein a prime mover comprising an electric motor 42 (FIG. 3) which may be small and of lightweight since only moderate power is needed to drive the roller mechanism. The motor 42 is suitably mounted upon the base plate 11 in a unit with a suitable speed reducing mechanism housed in a casing 43 interposed between the motor and the adjacent supporting bracket flange 18. At its opposite end, the motor shaft carries a cooling fan 44 for drawing cooling air in over the motor in operation through a screened air inlet opening 45 in the adjacent side wall of the housing 45 (FIG. 1).

Motive power from the motor-speed reducer unit is transmitted through a shaft 47 carrying a drive sprocket 48 (FIGS. 3 and 4) to a sprocket chain 49 trained thereover and over a driven sprocket 50 mounted on an extension from the adjacent journal end of the forwardmost of the belt rollers 30. Driving of the driven roller 30 counterclockwise as viewed in FIGURE 2 correspondingly drives the belt 29, as indicated by directional arrow to thereby rotate the exposure cylinder 28 clockwise.

Figure 5:
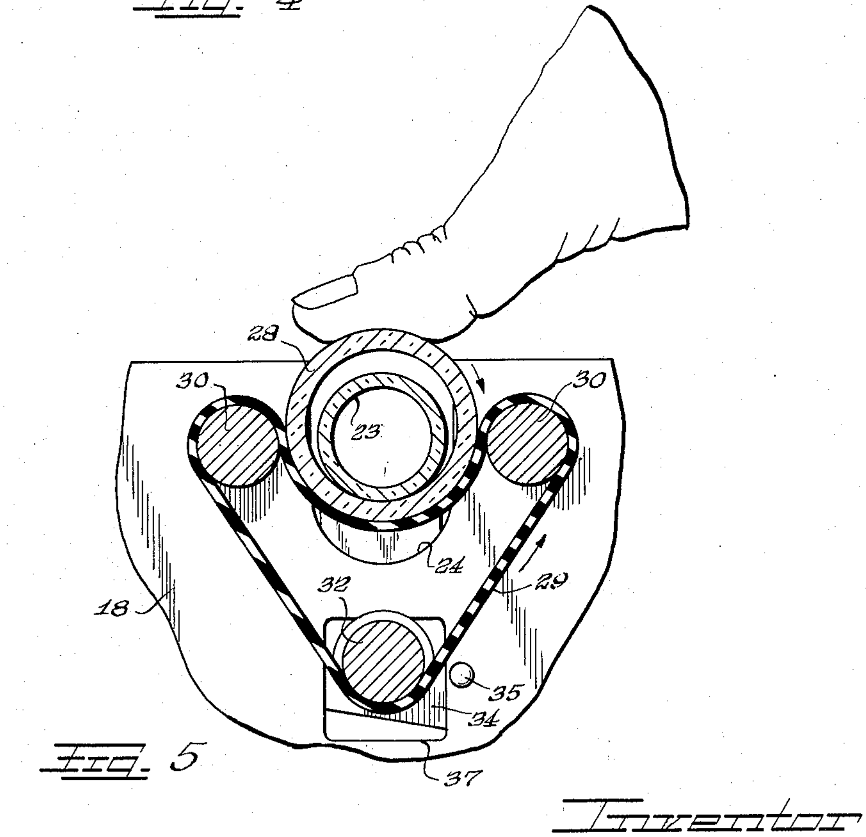
FIGURE 5 is an enlarged fragmentary vertical sectional detail view taken substantially on the line V—V of FIGURE 3 and illustrating how the rotary transparent exposure tube is adapted to be assembled with the supporting and drive belt.

By virtue of the over 180° cylinder engaging relation of the tensioned belt 29 as supported for this purpose by the rollers 30, assembly of the cylinder 28 with the belt is effected with most convenience while the belt 29 is being driven. To this end, the light tube 23 is assembled through the cylinder 28 and the light tube terminals engaged with the terminal and supporting brackets 25, while the cylinder 28 lies upon the relatively slack belt 29 between the rollers 30. Then, with the belt 29 driven as indicated by the directional arrow in FIGURE 5 and thereby turning the cylinder 28 as indicated by directional arrow, digital pressure such as by means of the thumb of a person's hand as indicated is applied upon the top of the cylinder 28 for thereby effecting nipping compression of the elastic material of the belt interposed between the periphery of the cylinder and the peripheries of the rollers 30. The strong frictional gripping of the engaged perimeter of the cylinder adjacent to the positively driven roller 30 causes the cylinder 28 to be drawn positively down into the loop of the belt 29 between the rollers 30, with corresponding lengthening of the cylinder cradling loop and tensioning of the belt 29 by drawing up of the lower tensioning roller cradling loop, until the axis of the cylinder 28 is below the plane through the axes of the rollers 30, with the perimeter of the cylinder 28 engaged over more than 180° thereof by the belt 29. In this below center relationship of the cylinder 28, the cylinder is firmly held for substantially concentric rotation about the light source tube 23.

Removal of the cylinder 28 can be readily effected by forcing the same upwardly to move up over center past the nips of the rollers 30, especially while the belt 29 is at rest. This may be desirable for cleaning purposes or in order to replace the light source lamp tube 23.

Coordinated operating control of the light source tube 23 and the actuating motor 42 is effected herein through an electrical control circuit shown more or less schematically in FIGURE 3 and operable by a single actuating knob 51 (FIGS. 1 and 2) conveniently accessible on the upper forward portion of the machine and more particularly of the housing 7. In addition, the control knob 51 is operable to control the intensity of illumination provided by the lamp tube 23. To this end, the knob 51 is carried by an upstanding shaft 52 (FIGS. 2 and 3) rotatably supported by a bracket fixture 53 carried by the base plate 11 and also providing support for a rheostat 54 and an associated on-off switch 55. In the present instance, the switch 55 is of the normally closed type and provided with a lever arm 57 normally spring urged into the switch closing position but arranged to be swung into open switch position by a finger or arm 58 rigidly carried by the lower end portion of the operating shaft 52. In the off position, a rheostat controlling arm 59 rigidly connected to the shaft 52 is disposed in the minimum resistance position with respect to the rheostat coil.

In the off position of the shaft 52 and thus open condition of the switch 55, a power source circuit through electrical leads 60 is broken. Upon turning of the shaft 52 by means of the knob 51 into the on position and closing of the switch 55 to complete the circuit through the power leads 60 the motor 42 connected in series in the power circuit with the switch 55 is energized to drive the exposure mechanism 22. At the same time a circuit through the rheostat 54 is closed by way of a lead 61 and a transformer 62 mounted on the base plate 11 rearwardly of the light tube 23, and the terminal contacts for the light tube supported by the brackets 25, a starter 63 being also provided in the lamp circuit as is customary for fluorescent tubes. Initially maximum intensity of illumination is provided by the light source tube 23 in view of the minimum resistance position of the rheostat control arm 59, but if illumination of less intensity is desired the control knob 51 can be turned to carry the rheostat arm 59 selectively to a higher resistance position on the rheostat for decreasing the illumination intensity. Such control of illumination intensity is desirable for attaining optimum results in photographic exposure for various types of originals of which copies are to be made. By having the illumination intnsity controllable as desired, uniform rate of rotation of the exposure cylinder 28 is possible and thus a simple, direct one speed drive made practical.

For visual indexing of the "on" and "off" positions as well as graduated illumination intensities, a position indicating and calibrated index disk 64 ((FIGS. 1 and 2) is preferably associated with the handle knob 51 by having the disk mounted on the housing 7 under the knob 51 concentric with the shaft 52 and fixedly secured to the housing. By having the knob 51 secured removably as by means of conventional set screw or other preferred connection, removal and replacement of the housing 7 is readily effected by removal of the control handle knob 51 from the shaft 52.

Forwardly from the exposure mechanism 22 provision is made within the housing 7 for development mechanism 65. This includes a developer tray 67 having a receptacle 68 for developer solution and provided in the forward portion of the receptacle with a plurality of vertical separators 69 defining guide slots into the receptacle 68 for reception of photocopy papers to be wetted with developer solution. The developer tray 67 is constructed as a separable unit arranged to be slidably supported upon the base plate 11 which has a pair of transversely spaced angular stops 70 (FIGS. 2 and 3) mounted thereon in properly rearwardly spaced relation to the front edge of the base plate to define the rearward position of the tray 67 by engagement of its rear lower margin upon insertion of the tray into the front of the housing and between the forward portions of the upstanding bracket flange members 17 and 18.

In the front panel portion of the housing wall 9 a suitable opening is provided for insertion and removal of the developer tray 67 and such opening is arranged to be closed by a door 71 hingedly secured along its lower margin by means of a piano type hinge 72 to the depending flange 12 along the front of the base panel 11. A substantially flush closed relationship of the door 71 to the front wall 9 of the casing 7 is afforded by the provision of a suitably inset seating flange 73 defining the opening in the front wall 9 (FIG. 1) and also providing reinforcement for the front wall. This inset flange structure extends up into the adjacent top wall portion of the casing and is receptive of a narrow upper reinforcing and finishing flange 74 on the door 71. This top flange 74 also cooperates with the adjacent top wall portion to define an access slot 75 under which the guide slot front portion of the tray 64 is arranged to be disposed in the assembly. At the lower side of the tray opening in the housing, the base plate 11 is appropriately notched as at 77 adjacent to each opposite side of the door 71 for reception of the inturned reinforcing and door seating flange structure 73 (FIGS. 2 and 3).

For squeezing substantially dry photocopy papers that have been immersed in the body of developer fluid in the receptacle 68 of the developer tray, a pair of elastically surfaced squeeze rolls 78 is provided rotatably mounted on and between the upper forward portions of the supporting bracket flanges 17 and 18 at a suitable elevation generally above the rear portion of the tray 65 and with the nip of the rolls 78 arranged to run upwardly and in alignment with a transverse exit slot 79 thereabove in the top wall 8 of the housing (FIGS. 1 and 2). Both of the squeeze rolls 78 are provided with respective mounting shafts 80.

One of the squeeze rolls 78 is mounted in stationary relation on the supporting bracket flanges 17 and 18 which for this purpose are provided with respective bearings 81 rotatably supporting the journal ends of the supporting shaft of such roll, herein shown as being the rearmost of the rolls (FIGS. 3 and 4). At the end nearest the power source for the machine, that is at the right-hand side of the machine, the shaft 80 of the fixed axis squeeze roll is provided with a rigidly coupled sprocket 82 over which the drive chain 49 is trained so that the squeeze rolls are driven simultaneously with the belt actuating rollers 30.

The remaining one of the squeeze rolls 78 is preferably mounted yieldably so as to engage its companion squeeze roll with yieldable pressure. To this end, the shaft 80 of the yieldably mounted roll is rotatably supported in respective bearings 83 carried by plate compression levers 84 slidably supported by respective fixed pivots 85 secured to the upper respective margins of the bracket flanges 17 and 18 above clearance apertures 87 therein. The respective compression levers 84 project downwardly past the respective clearance apertures 87 and have anchored to respective studs 88 thereon respective tension springs 89 extending rearwardly and having their rear ends anchored to fixed studs 90 on the respective supporting flange bracket members 17 and 18. The springs 89 are normally under tension to draw the compression levers 84 rearwardly for compressibly but resiliently yieldably drawing the forward squeeze rolls 78 towards and against the nip of the rear fixed axis squeeze roll 78. By having the lower portion of the respective compression levers 84 substantially longer than the upper portion with respect to the supported roll axis, an advantageous leverage to spring tension ratio is attained enabling the use of rather lightweight structure in the springs 89.

In operation of the photocopy machine, it is conveniently mounted upon any suitable support such as a table, desk, shelf, or the like, and the electrical power source leads 60 connected with a power line outlet as by means of a conventional plug (not shown). The door 71 is swung open (FIGS. 3 and 4) and the tray 65 inserted in place within the chamber therefor at the front of the housing and before or after such insertion of the tray, a supply of developer solution 91 (FIG. 2) is poured into the developer receptacle 68. Then the manual control handle knob 51 is turned from the "off" position to the "on" position, thereby starting the motor 42 and lighting the illumination tube 23. A succession of originals and negative photocopy papers in laminar respective pairs are inserted endwise through a transverse guide slot 92 in the housing top 8 aligned over the entry bight between the exposure cylinder 28 and the belt 29 (FIG. 2), the papers as indicated in dash outline being gripped between the cylinder and belt and tightly pressed together and against the transparent cylinder so that the desired intensity of light from the light tube 23 will penetrate to the sensitized face of the negative photocopy paper against which the inscription carrying face of the original is pressed. At the exit bight between the cylinder 28 and the belt 29, the trailing end portions of the laminar original and negative paper travel upwardly through an exit slot 93 in the housing top 8 aligned therewith transversely of the housing.

It will be observed (FIG. 2) that the entry and exit slots 92 and 93 are defined by a depending flange 94 integral with the housing top 8 and carrying integrally therewith longitudinally of and separating the slots 92 and 93 a guard hood portion 95 (FIGS. 1 and 2). At its forward margin, the hood 95 slopes downwardly to provide with the forward portion of the flange 94 a funnel-like convergence to the entry slot 92 which, it will be observed, is quite narrow so as to assure reasonably close adjacency of the leading end portions of the superposed papers inserted through the entry slot into the entry bight between the cylinder 28 and the belt 29. At the opposite, rear side of the hood 95 it coacts with the flange 94 to provide the exit slot 93 of substantial width to provide a passage of ample width to accommodate the trailing coextensive ends of the papers after exposure even though there may be a tendency toward spreading apart of the trailing ends as they leave the exit bight between the cylinder 28 and the belt 29. Moreover, by having the hood 95 disposed in spaced adjacent generally parallel overlying relation to the cylinder 28, the hood provides a hold-down for the cylinder 28 should the same during a period of inactivity tend to work up from between the rollers 30 by reason of factors such as tensioning of the belt 29 by the tensioning mechanism including the tensioning idler roller 32 or recovery tendency of the compressed material of the belt 29 between the cylinder and the rollers 30, or a combination of such factors. The spacing between the hood 95 and the cylinder 28 is slight as shown in FIGURE 2 so that the cylinder will be held advantageously for immediate return to its fully cradled operating position by the belt 29 upon reactivation of the driving assembly to drive the belt 29.

After the exposed negative photocopy papers have been separated from the originals, they are assembled with positive photocopy papers, with the emulsion surfaces of the papers juxtaposed, and the photocopy papers are thrust leading ends downwardly coextensively through the access opening 75 and down separately through respective slots provided by the separators 69 in the tray receptacle 68, as indicated in dash outline at the front of the machine as shown in FIGURE 2. Downward thrust upon the photocopy papers is continued until the leading ends have passed entirely through the body of developer solution 91 and have been engaged in the nips of the squeeze rolls 78 which then draw the papers in squeeze together image transferring relation upwardly to exit through the exit opening 79 and squeezed substantially dry of developer solution which falls back into the developer tray.

Although one side photocopy is indicated in FIGURE 2, the machine is equally adaptable for double sided photocopying wherein a single negative has both sides thereof sensitized so that two positive prints are secured simultaneously during development. In such instance, the negative photocopy paper is passed through the exposure zone or station of the machine afforded by the cylinder 28 and the belt 29 twice with respective originals and then the negative paper is developed between a pair of positive photocopy papers, utilizing all three of the developer tray slots provided by the guide separators 69.

As an indication of the compactness with which the photocopy machine of the present invention may be constructed, in a commercial form of the device suitable for handling originals and photocopy papers up to 11⅝" wide, the over-all height of the machine is only slightly over 5", with an over-all width of only slightly over 22" and a depth of only slightly over 12". This enables the unit to be used in small available space. Shipment and storage are also greatly facilitated by the small space requirements of the machine.

It will be understood that modifications and variations may be effected without departing from the scope of the novel concepts of the present invention.

I claim as my invention:

1. In photocopy apparatus including supporting structure, a pair of spaced parallel rollers, an endless belt looped over said rollers and providing a depending cradle loop therebetween, a translucent hollow cylinder rotatably supported by said cradle loop, means for driving the rollers and belt for thereby driving said cylinder, and means for supporting a light source lamp longitudinally within said cylinder, said rollers being spaced with the nip portions adjacent to said cylinder spaced apart slightly more than the diameter of the cylinder but less than the combined diameter of the cylinder and two thicknesses of the endless belt so that in running of the belt over the rollers with the cylinder cradled in said cradle loop the cylinder is drawn to an axis thereof below a plane through the axes of the rollers whereby to effect snug gripping engagement of the cradle loop of the belt over more than 180° of the periphery of the cylinder, whereby cradling of the cylinder can be effected simply by placing the cylinder generally parallel between said rollers against the portions of the belt trained over the rollers and applying digital pressure against the cylinder toward said cradle loop.

2. In photocopy apparatus including supporting structure, a pair of spaced parallel rollers, an endless belt looped over said rollers and providing a depending cradle loop therebetween, a translucent hollow cylinder rotatably supported by said cradle loop, means for driving the rollers and belt for thereby driving said cylinder, means for supporting a light source lamp longitudinally within said cylinder, said rollers being spaced with the nip portions adjacent to said cylinder spaced apart slightly more than the diameter of the cylinder but less than the combined diameter of the cylinder and two thicknesses of the endless belt so that in running of the belt over the rollers with the cylinder cradled in said cradle loop the cylinder is drawn to an axis thereof below a plane through the axes of the rollers whereby to effect snug gripping engagement of the cradle loop of the belt over more than 180° of the periphery of the cylinder, and a tensioning roller engaged within the belt below said cradling loop and maintaining a substantially taut condition of the belt with the cylinder operatively depressed within said cradling loop in said offset relation of the axis of the cylinder relative to said plane, whereby cradling of the cylinder can be effected simply by placing the cylinder generally parallel between said rollers against the portions of the belt trained over the rollers and applying digital pressure against the cylinder toward said cradle loop and removal of the cylinder can be effected simply by ejection of the cylinder from between the rollers by the tension on the cradle loop from said tensioning roller during non-operating condition of the apparatus or otherwise forcing the cylinder to move over center past the nips of said spaced rollers.

3. In photocopy apparatus including supporting structure, said supporting structure removable supporting a cylindrical light source lamp in a horizontal position and a pair of spaced parallel rollers having the lamp in parallel relation therebetween and with the axes of the rollers disposed slightly above the axis of the lamp, an endless belt looped over said rollers and under said lamp and providing a depending cradle loop opposing the lamp in spaced relation, a translucent hollow cylinder shorter than the lamp disposed in spaced relation thereabout and rotatably supported by said cradle loop, said rollers being spaced with the nip portions adjacent to said cylinder spaced apart slightly more than the diameter of the cylinder but less than the combined diameter of the cylinder and two thicknesses of the endless belt so that in the running of the belt over the rollers with the cylinder cradled in said cradle loop the cylinder is drawn to an axis concentric with the axis of the lamp and below a horizontal plane through the axes of the rollers whereby to effect snug tractional gripping engagement of the cradle loop of the belt over more than 180° of the periphery of the cylinder and so that in the rotation of the cylinder it remains substantially concentrically spaced from the perimeter of the lamp, and means providing yieldable tension on the belt to maintain the cradle loop in said cylinder-cradling relation and maintaining said substantial concentricity of the cylinder relative to the lamp, whereby cradling of the cylinder can be effected simply by placing the cylinder generally parallel between said rollers against the portions of the belt trained over the rollers and applying digital pressure against the cylinder toward said cradle loop and removal of the cylinder can be effected simply by ejection of the cylinder from between the rollers by the tension on the cradle loop from said tensioning roller during non-operating condition of the apparatus or otherwise forcing the cylinder to move over center past the nips of said spaced rollers.

4. In photocopy apparatus including supporting structure, said supporting structure removably supporting a cylindrical light source lamp in a horizontal position and a pair of spaced parallel rollers having the lamp in parallel relation therebetween and with the axes of the rollers disposed slightly above the axis of the lamp, an endless belt looped over said rollers and under said lamp and providing a depending cradle loop opposing the lamp in spaced relation, a translucent hollow cylinder shorter than the lamp disposed in spaced relation thereabout and rotatably supported by said cradle loop, said rollers being spaced with the nip portions adjacent to said cylinder spaced apart slightly more than the diameter of the cylinder but less than the combined diameter of the cylinder and two thicknesses of the endless belt so that in the running of the belt over the rollers with the cylinder cradled in said cradle loop the cylinder is drawn to an axis concentric with the axis of the lamp and below a horizontal plane through the axes of the rollers whereby to effect snug tractional gripping engagement of the cradle loop of the belt over more than 180° of the periphery of the cylinder and so that in the rotation of the cylinder it remains substantially concentrically spaced from the perimeter of the lamp, means providing yieldable tension on the belt to maintain the cradle loop in said cylinder-cradling relation and maintaining said substantial concentricity of the cylinder relative to the lamp, and a cover member overlying the cylinder and rollers and having slots therein substantially aligned with the bights between the cylinder and the belt where the belt runs over said rollers, said slots being separated by a guard hood portion of the cover normally spaced above the cylinder so that the cylinder will rotate freely under the hood and the hood serving as a hold-down for the cylinder should the cylinder during a period of inactivity or non-running of the belt tend to work up from between the rollers by reason of factors such as tensioning of the belt or recovery tendency of the material of the belt.

5. Apparatus as defined in claim 2, including means overlying the cylinder in normally spaced relation and operative to restrain the cylinder against escape from said cradle loop when the belt is stopped and the tension on the cradle loop imposed by said tensioning roller tends to force the cylinder toward escape from between said spaced rollers.

References Cited in the file of this patent

UNITED STATES PATENTS

| | | |
|---|---|---|
| 2,459,362 | Cary | Jan. 18, 1949 |
| 2,574,215 | Kunstadter | Nov. 6, 1951 |
| 2,615,381 | Hoefeli | Oct. 28, 1952 |
| 2,616,344 | Patience | Nov. 4, 1952 |
| 2,732,778 | Limberger | Jan. 31, 1956 |
| 2,783,697 | Eisner | Mar. 5, 1957 |
| 2,786,401 | Briggs | Mar. 26, 1957 |
| 2,793,574 | Unterberger | May 28, 1957 |
| 2,817,279 | Ellsworth | Dec. 24, 1957 |
| 2,875,677 | Ellis | Mar. 3, 1959 |
| 2,903,954 | Schwienbacher | Sept. 15, 1959 |
| 2,946,272 | Eisner | July 26, 1960 |

FOREIGN PATENTS

| | | |
|---|---|---|
| 193,531 | Germany | Jan. 29, 1907 |
| 483,607 | Great Britain | Apr. 22, 1938 |
| 935,529 | Germany | Nov. 24, 1955 |